Oct. 20, 1959 L. G. SIMJIAN 2,909,107
VENDING MACHINE COMBINED WITH CAMERA MEANS
Filed Nov. 18, 1958 3 Sheets-Sheet 1
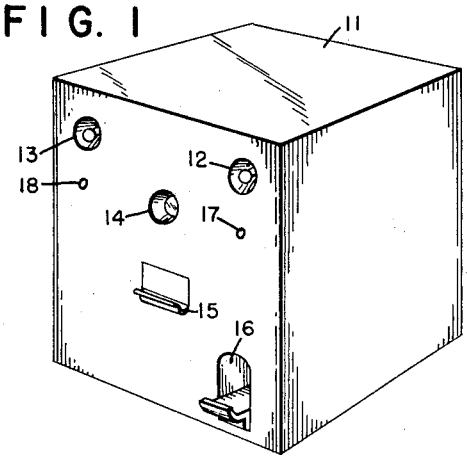
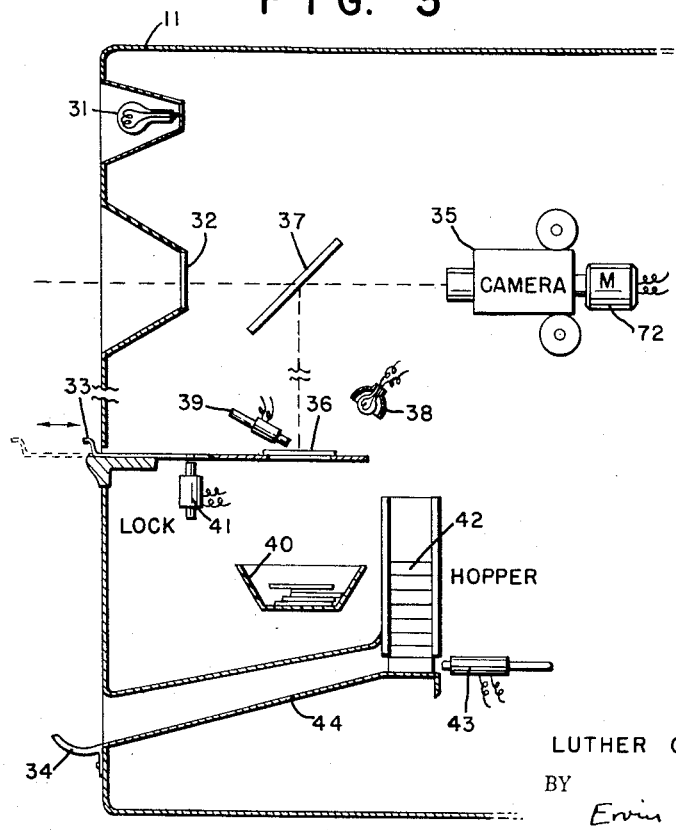
INVENTOR.
LUTHER G. SIMJIAN
BY
AGENT.

Oct. 20, 1959   L. G. SIMJIAN   2,909,107
VENDING MACHINE COMBINED WITH CAMERA MEANS
Filed Nov. 18, 1958   3 Sheets-Sheet 2

INVENTOR.
LUTHER G. SIMJIAN
BY
Erwin B. Steinberg
AGENT.

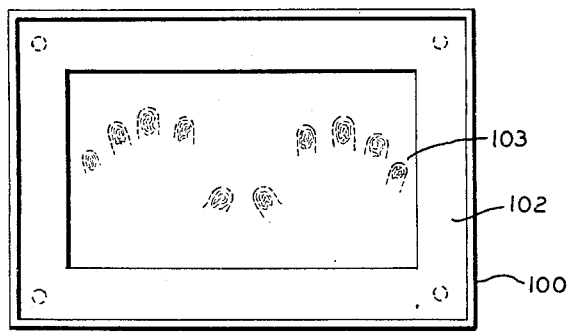
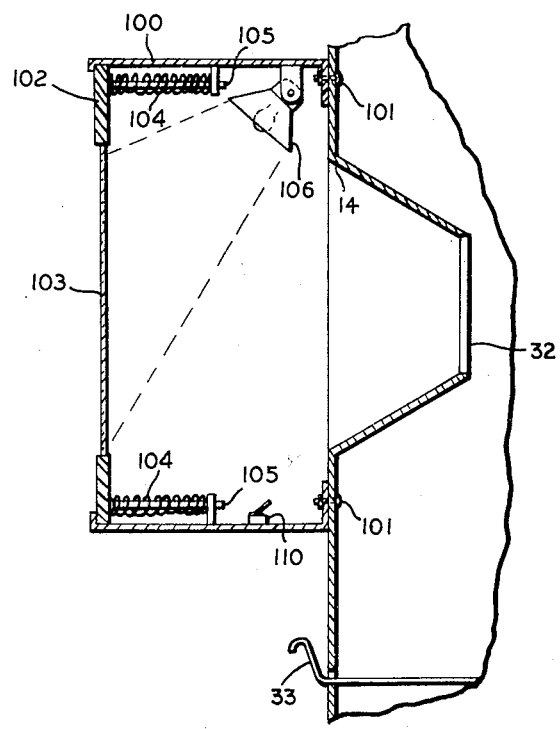

United States Patent Office 2,909,107
Patented Oct. 20, 1959

2,909,107

VENDING MACHINE COMBINED WITH CAMERA MEANS

Luther G. Simjian, Greenwich, Conn.

Application November 18, 1958, Serial No. 781,418

15 Claims. (Cl. 95—1.1)

This application is a continuation-in-part of my co-pending application for U.S. Letters Patent, Serial No. 691,000 filed October 18, 1957, now abandoned.

This invention relates to automatic vending apparatus and has particular reference to an automatic vending machine in combination with camera means. The invention in one form concerns a machine wherein the identity of a person using the machine as well as the article deposited by this person is recorded in associated identifiable relationship prior to the machine vending an article of value in exchange for the article deposited.

The ever increasing demand for automatic vending machines and the desirability to dispense goods whose price exceeds the usual five, ten, and twenty-five cents variety have made it desirable to design a machine which is adapted to vend articles costing one dollar or more. Although an amount of money of this type could readily be inserted into a vending machine in the form of individual coins, it is apparent that few people carry change in the appropriate amount and coin denominations required to purchase goods costing one dollar or more. It is necessary therefore to provide a machine which will accept paper bills and vend an article of value in exchange for having deposited paper money. Obviously, a machine of this type entails certain risks inasmuch as establishing the genuineness of paper money is a much more difficult task than testing coin money for the usual, weight, magnetic and physical properties associated with each individual coin denomination. In order to overcome this difficulty the present invention not only makes a photographic record of the money or document deposited by the person operating the machine but can record also on a photographic film an image of an identifiable portion of the person using the machine, the latter image being disposed in identifiable relationship with the record of the money or document deposited, thus preserving the identity of the depositor. In the event of error, deliberate or intentional fraud, etc., the film which contains the recorded images will be developed and the identity of the depositor can be established by screening the film for the image of the money deposited which is of questionable validity.

It will be apparent that a machine of this type may be used in offices, factories, plants, and also in many public locations. Still further, such a machine will have considerable value in dispensing insurance policies, particularly travel insurance at airports and other terminals which at the present time require for maximum insurance coverage a premium payment of five dollars. This use is especially noteworthy since the policy is essentially a document without value until a claim is entered. In the event of discrepancy, it will be easy to develop the film and check the identity of the depositor with records supplied by the claimant or by the estate of the insured submitting proper documentation.

Moreover, the instant machine will be useful as money changing machine giving coin change in exchange for depositing paper money. In a typical example, a single dollar bill may be inserted into the machine and the coin change received is then available in connection with the usual coin-operated vending machines.

One of the objects of this invention therefore is the provision of an improved vending machine combined with camera means adapted to accept documents and similar articles.

Another object of the invention is to provide a vending machine combined with camera means which may be used by the public for obtaining articles of value corresponding to the article or money deposited.

Another object of the invention is to provide a vending machine combined with camera means for recording the image of an identifiable portion of the person using the machine in associated relationship with an image of the article deposited prior to ejecting an article of value from within the machine.

Another object of this invention is the provision of a combined vending apparatus and camera means in which the image of the person operating the machine is recorded onto a film and the object deposited by said person is also recorded in associated relationship with the person's image in order to produce a record of the person and of the article deposited for ready identification in the event of discrepancy.

Another and further object of the instant invention is the provision of a vending machine which is useable in connection with paper money.

Another and still further object of this invention is the provision of a machine which vends coin money in exchange for paper money deposited therein and retains the identity of the operator using the machine and of the paper money deposited.

In one form the invention comprises a vending machine combined with camera means which are actuated by a person operating the machine and which are adapted to record on a film the image of an identifiable portion of the person after the person has inserted an article of value into the vending machine. Means are disposed within the enclosure of the machine so that the image of the person is placed in identifiable relationship with the image of the article inserted. Upon taking of the pictures a hopper which contains articles of value related to the value of the article inserted into the machine is actuated and dispenses an article therefrom to the person.

For a better understanding of the present invention together with other and further objects thereof, reference is made to the following description taken in connection with the accompanying drawings in which:

Figure 1 is a perspective view of the combined vending and camera means;

Figure 2 is a timing diagram illustrating the operation of the various components within the apparatus;

Figure 3 is a cross sectional view, partly schematic, of the interior of the entire apparatus;

Figure 8 is an elevational view partly in section of an attachment which may be used on the vending machine, and Figure 9 is a front view of the attachment depicted in Figure 8.

Figure 4:
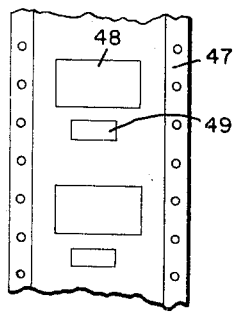
Figure 4 is a plan view of a film strip available from the apparatus.

As used hereinafter depositing an "article of value" shall include but not be limited to money in paper bill denomination, coin money, paper bills and coin money, checks, certificates which may be exchanged for other articles of value, and/or similar documents or instruments having a value on a negotiable or non-negotiable basis in the possession of the person operating the instant apparatus. Receiving an "article of value" in exchange for having deposited an article of value shall include but not be limited to the dispensing of an article of merchandise, an article of merchandise combined with change money, change money without merchandise, an insurance policy, a receipt, a certificate, or a similar article or document or instrument which in some manner must be purchased and/or is issued in exchange for depositing within the machine a first article of value.

Referring now to the figures and Figure 1 in particular, an enclosure 11 contains substantially all of the elements of the instant device. Numerals 12 and 13 indicate illuminating means which are used to illuminate the depositor posing in front of the camera when the exposure is being made. Aperture 14 admits light from the depositor posing to the camera lens confined within the apparatus. Numeral 15 represents a slide by means of which articles of value or documents are inserted into the machine and numeral 16 indicates the terminal point of a chute accessible from the exterior of the apparatus.

This chute connected to a compartment or hopper inside the apparatus serves to dispense articles from the compartment to the depositor. The entire device is started by the depositor depressing simultaneously push buttons 17 and 18.

The operation of the appartus may be visualized by following the timing diagram of Figure 2. The person or depositor wishing to operate the device first pulls out slide 15 and deposits an article thereupon. Having deposited on the slide, let us assume a one dollar bill, the depositor pushes the slide into the machine as indicated in Figure 1. Next, he depresses simultaneously push buttons 17 and 18 which are arranged approximately at head height so as to cause the person using the machine to assume a position where his head faces aperture 14. The momentary depressing of push buttons 17 and 18 starts the main motor of the apparatus, particularly the motor which operates certain timing cams in order to obtain the necessary sequences. A short moment after the motor is running, lights 12 and 13 become energized, the camera shutter opens and takes an exposure of the person facing the aperture and of the article on the slide, the lights become de-energized, the paper bill or other article deposited on the slide is ejected from the slide, and finally an article of value contained within a compartment or hopper within the apparatus is ejected through a suitable chute to terminal point 16. This completes the operation of the machine. In order to safeguard that the slide cannot be withdrawn prior to the paper bill or document having been ejected from the slide and deposited within the machine, the slide remains locked as soon as the motor starts until the time the article from the hopper is ejected. In this manner the person operating the machane is prevented from withdrawing the paper bill prior to the ejection of an article.

Figure 3 illustrates the approximate placing of the important components within the camera. Numeral 11 identifies the housing which carries near its front panel a suitable lamp 31, aperture 32, slide 33, and terminal point 34 of the vending chute. A motor operated camera 35 is in alignment with aperture 32 in order to take a picture of the person posing in front of the aperture 32. The camera is a motor-operated device which is well-known in the art and which is energized by an electrical contact means to take an exposure and thereafter automatically unwinds and advances the film from one roll to another roll in the appropriate amount.

An article of value such a document, article or paper bill 36 is located on the slide 33, inserted in the machine, and is in view of the lens of camera 35 by means of a transparent mirror 37. In this manner camera 35 records an image of the person posing in front of aperture 32 as well as of the article 36, both images in identifiable relationship with one another. Although in the instant disclosure a transparent mirror is shown it shall be clearly understood that double lens means may be employed, such as are shown in U.S. Letters Patent No. 2,699,100, L. G. Simjian, entitled "Camera," issued Janury 11, 1955, which shows an arrangement for recording the image of a person posing in identifiable relationship with the image of a serial number of an identifying ticket by the use of two distinct lens systems. Lamp 38 serves to illuminate the article 36 on the slide. An electromagnetic plunger 39 is used to eject the paper article from slide 33 upon the exposures having been made. Although plunger 39 as depicted comprises a rubber tipped electromagnetically actuated plunger, it will be understood that other means may be used such as a blast of air, moving or turning the slide, etc. in order to cause the article deposited on the slide to fall into the basket type receptacle 40 located underneath the slide.

Solenoid and plunger 41 serve to lock the slide in its "in" position when the machine is in operation. Hopper 42 contains a supply of articles to be dispensed to the exterior of the apparatus, a process which is initiated by solenoid and plunger combination 43 ejecting always the lowermost article via chute 44 to the terminal point 34.

Figure 4 shows a strip of film 47 taken by the camera 35 and illustrates the depositor's image 48 taken through aperture 32 in relation to the image 49 of the object deposited and resting on the slide. Both images are in identifiable relationship with respect to one another. It will be apparent that under normal conditions the film need not be developed. When there is, however, a discrepancy, or fraud, the film will be developed by standard commercial techniques.

Figure 5:
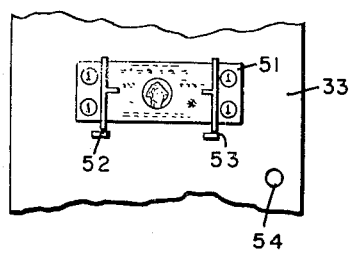
Figure 5 is a plan view of the slide upon which the article to be inserted into the machine is deposited.

Figure 5 shows a portion of the slide 33 and depicts a paper bill 51 held on the slide by means of two resilient prong members 52 and 53. The slide is equipped also with an aperture 54 which is engaged by the plunger of locking solenoid 41 to retain the slide locked in its "in" position. The slide has an aperture underneath the bill through which the bill can be dropped into the receptacle 40 upon actuation of plunger 39.

Figure 6:
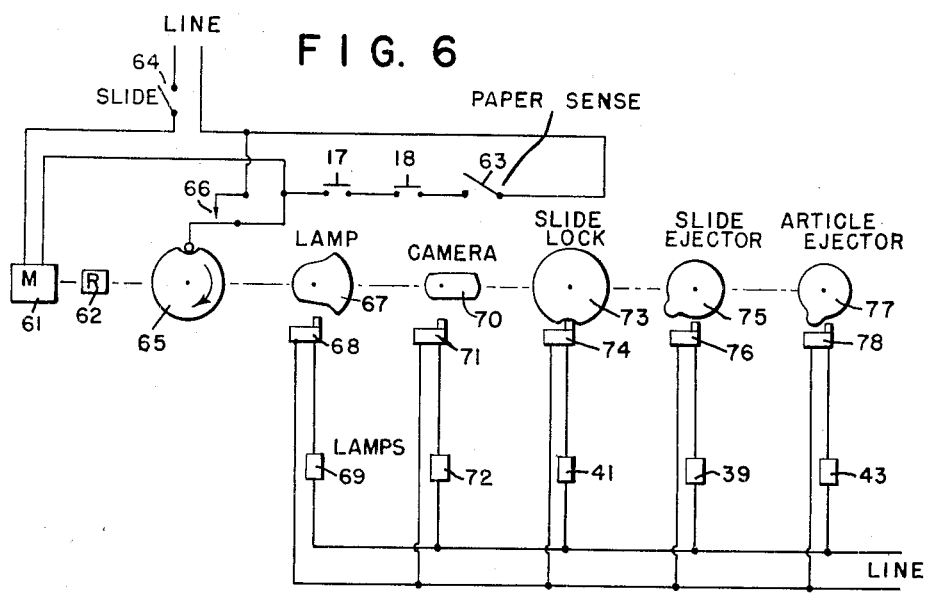
Figure 6 is a schematic circuit diagram of the entire apparatus.

Figure 6 is a schematic electrical circuit diagram of the entire apparatus. Motor 61 which drives via gear reducer 62 a series of timing cams is energized from line voltage so as to operate when push buttons 17 and 18, a paper sense switch 63 and a slide switch 64 are closed. Switch 63, a snap-acting switch commonly known as "microswitch," senses the presence of a document or paper on the slide so that the apparatus cannot be started if paper, such as money, is absent on the slide. Switch 64 renders motor 61 operative only then when the slide is in its full "in" position.

As soon as motor 61 has started the branch circuit comprising push buttons 17, 18 and article sense switch 63 is by-passed by virtue of cam 65 and switch 66 combination which serves to lock in the circuit for one cycle. Cam 67, the lamp cam, energizes via a switch 68, such as a microswitch, all lamps 69 of the apparatus. Camera cam 70 operates via another switch 71, camera motor 72 which serves to operate camera 35.

Locking cam 73 via switch 74 is used to energize solenoid 41 which causes the slide 33 to be locked in its "in" position while the apparatus is in operation. Slide eject cam 75 via switch 76 operates solenoid 39 to remove the paper money or article 36 from the slide 33 after camera 35 has taken the exposure and article ejector cam 77 via switch 78 operates solenoid 43 to eject an article of value such as merchandise, merchandise and money, an insurance policy, or other object from the compartment or hopper 42 for delivery to the depositor via chute 44.

Figure 7:
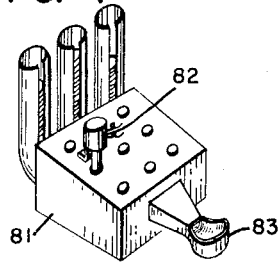
Figure 7 is an alternate dispensing device which may be arranged within the machine for dispensing coins.

Figure 7 illustrates schematically a typical coin vending machine which may be used in connection with the foregoing apparatus when it is desired to dispense coins either wholly or in part in exchange for the article deposited in the machine. This coin dispensing machine 81 is a conventional coin dispensing apparatus as widely used by commercial enterprises. For the instant purpose a solenoid 82 is mounted above an appropriate key to actuate the key upon receiving electrical impulse and to deliver change to scoop 83. This coin dispensing device may be used either to replace hopper 42, chute 44 and terminal area 34 or it may be used to supplement the hopper, both being used in combination with one another.

Instead of taking a photograph of the person's face using the machine, it may be desired to record an image of another identifiable portion, as for instance finger prints. This feature may be incorporated readily by a typical modification shown in Figures 8 and 9.

A frame 100 is mounted in front of the aperture 14 and fastened to the front panel by screw means 101. Within the frame there is disposed for slidable motion another frame 102 supporting a transparent glass plate 103. Frame 102 with its glass plate is normally biased in its outward position by springs 104 which surround respectively an associated guide rod 105. Plate 103 is illuminated by suitable light means 106 which replace illuminating means 12 and 13.

A user will be required to place his fingers on the plate and force it toward the rear. When plate 103 travels toward the rear, guide rod 105 will come into contact with switch 110 and a diagonally opposed guide rod will engage a similar switch (not shown) thereby causing actuation of the switches, both switches replacing the function of push button switches 17 and 18. It will be apparent that in this manner the user is forced for actuation of the machine to apply proper pressure to provide a satisfactory record of the finger prints. This rearward motion starts the machine. If desired provisions may be made for periodically wiping the glass surface. Inking pads may be used in conjunction with the finger printing. Again, the picture of the finger prints will provide complete identification of the user.

The recitation of recording an "image" of the article deposited or equivalent expressions thereof shall not be construed as meaning that the article must be photographed in its entirety but that certain portions may be photographed, portions which are sufficient to identify the article inserted. This feature may be employed in cases where there exists a legal restriction as to the photographing a document in its entirety or where it is impractical or not feasible to photograph the entire document. Instead of photography, electronic scanning and magnetic tape storage may be used without deviating from the principle disclosed.

It will be apparent to those skilled in the art that the machine described above may be also equipped with a sensing apparatus to determine and verify the genuineness of the document inserted into the machine prior to dispensing the article from the hopper. Verification devices employing photoelectric scanning means, alignment against a master copy, color determination, etc., are well-known in the art and need not be described. Moreover, such a verification device may be employed to automatically determine the denomination of the paper money such as the determination whether the bill deposited is in the denomiation of one, two, five or ten dollars, thereby either rejecting wrong denominations or dispensing from different hoppers articles which are related to the particular denomination inserted into the machine. It will be apparent that these means may readily be added and incorporated in the foregoing aparatus without departing from the scope of the invention.

It will still further be apparent to those skilled in the art that the article inserted into the machine and the article ejected from the machine may additionally be identified prior to acceptance or ejection respectively by affixing thereupon a date stamp, a serial number, time stamp, date or other markings or stampings for the purpose of identification, validation, or certification, these marking means being contained inside the machine. A typical stamping device is shown and recited in the patent referenced above.

While there have been described certain features and embodiments of the present invention it will be apparent to those skilled in the art that various modifications may be made therein without departing from the spirit of the present invention which shall be limited only by the scope of the appended claims.

What is claimed is:

1. A vending machine for use by a depositor and being equipped with a compartment to store articles to be ejected comprising; an aperture within said machine adapted to accept an object; means for photographically recording a portion of said accepted object; means for photographically recording an image of said depositor in identifiable relationship with said accepted object; and means for operating a mechanism to release an article stored in said compartment in response to the operation of said recording means.

2. A vending machine for use by a depositor and being equipped with a compartment to store articles to be ejected comprising; an aperture within said machine adapted to accept money; a first means for photographically recording a portion of said accepted money; a second means for photographically recording an image of said depositor in identifiable relationship with said accepted money image; and means for operating a mechanism disposed within said machine to release an article stored in said compartment in response to the operation of said first and second means.

3. A vending machine combined with camera means for use by a depositor and being equipped with a compartment to store money to be ejected comprising; an aperture within said machine adapted to accept paper money; a first means for photographically recording a portion of said accepted money; a second means for photographically recording the image of said depositor in identifiable relationship with said accepted money; and means for operating a mechanism to release money stored in said compartment in response to the operation of said first and second means.

4. A vending machine combined with camera means and being equipped with a storing and dispensing means comprising; means for recording on a photographic medium the image of a person posing in front of said apparatus; means carried by said apparatus for recording on a photographic medium and in associated identifiable relationship with the image of said person, the image of a document brought by said person into position for recording by said apparatus; means for storing said document within said apparatus in response to having photographically recorded the images of said person and of said document; and means disposed within said apparatus for dispensing to a position accessible from the exterior of said apparatus objects related to the value of said document, said dispensing means being actuated in response to the operation of said recording and storing means.

5. A photographic apparatus in combination with a storing and coin dispensing means comprising; means for recording on a photographic medium the image of a person posing in front of said apparatus; means carried by said apparatus for recording on a photographic medium and in associated identifiable relationship with the image of said person, the image of a document brought by said person into position for recording by said apparatus; means for storing said document within said apparatus in response to having photographically recorded the images of said person and of said document; and coin dispensing means disposed within said apparatus for dispensing to a position accessible from the exterior of said apparatus coins, said dispensing means being actuated in response to the operation of said recording and storing means.

6. A photographic apparatus in combination with a storing and dispensing means comprising; means for recording on a photographic medium the image of a person posing in front of said apparatus; means carried by said apparatus for recording on a photographic medium and in associated identifiable relationship with the image of said person, the image of a document inserted by said person into said photographic apparatus; means for storing said document within said apparatus in response to having photographically recorded the images of said person and of said document on said medium, and means disposed within said apparatus for dispensing to a position accessible to said person posing objects related to the value of said document, said means for dispensing being actuated in response to the operation of said recording and storing means.

7. A photographic apparatus in combination with a storing and dispensing means comprising; means for recording on a photographic medium an image of a depositor posing in front of said apparatus; means carried by said apparatus for recording on a photographic medium and in associated identifiable relationship with the image of the depositor the image of an article inserted by said depositor into said apparatus; means for storing said article within said apparatus in response to having photographically recorded the images of said depositor and of said article; means disposed within said apparatus for dispensing to a position accessible from the exterior of said apparatus an object related to the value of said article deposited, said dispensing means being actuated in response to the operation of said recording and storing means, and locking means coacting with said apparatus rendering the article deposited inaccessible to the depositor when the photographic apparatus has been started.

8. A vending machine for use by a depositor and being equipped with a compartment to store articles to be released comprising; an aperture within said machine adapted to accept an object; means for photographically recording an image of a portion of said accepted object; means for photographically recording an image of said depositor in identifiable relationship with the image of said object; means for operating a mechanism to release an article stored in said compartment in repsonse to the operation of said recording means, and timing means for controlling the sequential operation of said photographic recording means and of said article release mechanism.

9. A photographic apparatus in combination with a storage and dispensing means comprising; means for recording on a photographic medium an image of a depositor posing in front of said apparatus; means carried by said apparatus for recording on a photographic medium and in identifiable relationship with the image of the depositor the image of an article inserted by said depositor into said apparatus; means for storing said article within said apparatus in response to having photographically recorded the images of said depositor and of said article; means disposed within said apparatus for dispensing to a portion accessible from the exterior of said apparatus an object related to the value of said article deposited, said dispensing means being actuated in response to the operation of said recording and storing means; locking means coacting with said apparatus rendering the article deposited inaccessible to the depositor when the photographic apparatus has been started, and means for controlling the operation of said recording means, storing means, dispensing means and locking means.

10. A vending machine for use by a depositor and being equipped with a compartment to store articles to be ejected comprising; an aperture within said machine adapted to accept an object; means for photographically recording a portion of said accepted object and for recording also an image of said depositor in identifiable relationship with the image of said accepted object; said recording means including a photographic camera in combination with image deflecting means; and means for operating a mechanism to release an article stored in said compartment in response to the operation of said recording means.

11. A vending machine for use by a depositor and being equipped with a compartment to store articles to be ejected comprising; an aperture within said machine adapted to accept an object; means for photographically recording a portion of said accepted object; means for photographically recording an image of an identifiable portion of said depositor in identifiable relationship with said accepted object; and means for operating a mechanism to release an article stored in said compartment in response to the operation of said recording means.

12. A vending machine for use by a depositor and being equipped with a compartment to store articles to be ejected comprising; an aperture within said machine adapted to accept an object; means recording an image of a portion of said accepted object; means recording an image of an identifiable portion of said depositor in identifiable relationship with said accepted object; means operating a mechanism to release an article stored in said compartment in response to the operation of said recording means, and means operatively connected to said machine upon which the identifiable portion is placed to render the machine operative.

13. A vending machine for use by a depositor, comprising: an aperture within the machine adapted to accept and store within the machine an object which is being exchanged for a second object to be released from the machine: means photographically recording a portion of the accepted object, and means for operating a mechanism to release the second object from the machine in response to the operation of said recording means.

14. A vending machine for use by a depositor, comprising: an aperture within the machine adapted to accept and store an object within the machine which is being exchanged for a second object to be released from the machine: means recording an image of a portion of the accepted object while retaining the object within the machine, and means for operating a mechanism to release the second object from the machine in response to the operation of the recording means.

15. A vending machine for use by a depositor, comprising: an aperture within the machine adapted to accept and store within the machine money which is being exchanged for an article stored in the machine and to be released therefrom; means recording an image of a portion of the accepted money, and means for operating a mechanism to release the article from within the machine in response to the operation of the recording means.

References Cited in the file of this patent
UNITED STATES PATENTS
2,796,812   Koci ------------------ June 25, 1957